United States Patent [19]

Jacobus

[11] 3,833,482

[45] Sept. 3, 1974

[54] MATRIX FOR FORMING MESH

[75] Inventor: Dan Jacobus, New Brighton, Minn.

[73] Assignee: Buckbee-Mears Company, St. Paul, Minn.

[22] Filed: Mar. 26, 1973

[21] Appl. No.: 344,980

[52] U.S. Cl. .................................. 204/11, 204/281
[51] Int. Cl. .......................... C23b 7/00, B01k 1/00
[58] Field of Search ............... 204/11, 12, 281, 3, 4

[56] References Cited

UNITED STATES PATENTS

| | | | |
|---|---|---|---|
| 2,529,086 | 11/1950 | Law | 204/11 |
| 2,702,270 | 2/1955 | Donahue et al. | 204/11 |
| 2,765,230 | 10/1956 | Tinklenberg | 204/11 |
| 2,805,986 | 9/1957 | Law | 204/11 |
| 3,703,450 | 11/1972 | Bakewell | 204/281 |

*Primary Examiner*—T. M. Tufariello
*Attorney, Agent, or Firm*—Jacobson and Johnson

[57] ABSTRACT

A reusable sandwich type matrix for the formation of fine mesh comprising a base plate, a photoresist defining the mesh pattern, and a silica coating encapsulating the top of the base plate and the photoresist.

5 Claims, 4 Drawing Figures

PATENTED SEP 3 1974 3,833,482

MATRIX FOR FORMING MESH

BACKGROUND OF THE INVENTION

1. Field of the Invention

This invention relates generally to matrices and, more specifically, a process for making an inexpensive, reusable matrix for the manufacture of fine mesh.

2. Background of the Invention

Briefly, the manufacture of fine mesh for use in electronic tubes is well known in the art. The mesh has a crisscrossing pattern, is extremely fine, has high light transmission, high strength, and uniform openings throughout the mesh. There are numerous prior art techniques and processes for making mesh using a matrix.

One of the main prior art processes is shown in assignee's Tinklenberg U.S. Pat. No. 2,765,230. The Tinklenberg patent shows a matrix for making fine mesh which utilizes a set of resist islands located on a smooth conductive substrate. Still other techniques are shown in the following patents: Law U.S. Pat. No. 2,529,086; Donahue et al. U.S. Pat. No. 2,702,270; Law U.S. Pat. No. 2,702,274; Law U.S. Pat. No. 2,805,986. Of these patents, the Law U.S. Pat. No. 2,529,086 describes a second major process for making a matrix. In the Law process the substrate is a ruled glass master which is etched to produce a crisscrossing pattern of recessed regions therein. The regions are then filled with a suitable conducting material so that one can electroform mesh on top of the conductive patterns in the recessed regions of the glass master. This is in contrast to the Tinklenberg process in which the substrate is a smooth conducting surface with islands of resist located on top of the smooth surface. In Tinklenberg, the resist islands act as barriers to prevent electroforming of mesh thereon. In Law the glass master acts as a barrier to prevent electroforming of mesh thereon. Both of these prior art patents offer certain unique advantages. The Law process is advantageous because the matrix can be reused up to 200 times without having to replace the matrix. That is, one can electroform and strip on the order of 200 different pieces of mesh on a single matrix without having to replace the matrix. However, the disadvantage of the Law matrix is that the matrix is an expensive item because it has to be made through a tedious process. In order to manufacture a Law matrix, one uses a ruling engine to scribe marks along the surface of a resist coated glass substrate. After the glass substrate has been marked in this manner, the substrate is etched with hydrofluoric acid. The etching produces recess regions whereby the glass was exposed to the hydrofluoric acid. Next, the resist coating, usually wax, is removed to leave a network of crisscrossing regions in the glass master.

Although this process produces an accurate matrix, it is relatively expensive as well as time consuming to make even a small piece of mesh. That is, to make mesh having a size of 1,000 to 2,000 lines per inch requires multiple passes as only one line can be made per pass of the ruling engine. It is this process of scribing and etching a glass master that is time consuming and expensive. Thus, even though the glass master can be used up to 200 times, it still greatly adds to the cost of the mesh.

On the other hand, the Tinklenberg process which is described in U.S. Pat. No. 2,765,230 also requires utilizing a ruled glass master but the ruled glass master is only used as a pattern for forming a matrix in photoresist on a second master plate. Thus, Tinklenberg allows one to reuse the glass master indefinitely. However, the Tinklenberg matrix made from photoresist and the master plate is not nearly as durable as the glass matrix of Law. Thus, the resist coated matrix cannot be reused as frequently although it is substantially cheaper to manufacture because one does not have to make a new glass master every time one has to make a new matrix.

The present invention is a combination of the processes described in the Law patent and the Tinklenberg patent to produce a matrix having substantially all the major advantages of both the Law process and the Tinklenberg process without the major disadvantages of either process.

SUMMARY OF THE INVENTION

Briefly, the present invention is the discovery that utilization of a glass master as a pattern for forming a resist type matrix such as Tinklenberg followed by sputtering a layer of silica over the matrix produces a low cost silica coated matrix which has the durability for extended reuse.

BRIEF DESCRIPTION OF THE DRAWING

Referring to the drawing.

DESCRIPTION OF THE PREFERRED EMBODIMENT

In the first step of my process, one cleans a smooth base plate of metal, plastic, ceramic or glass in order to apply a smooth layer of a conducting material over the base plate. One suitable material for the base plate is copper because of its good electrical and heat conductivity. If copper is used the surface of the copper base plate can be nickel plated in a watts bath according to conventional procedures. A nickel layer of approximately .001 inch thick is ordinarily sufficient although a thicker layer may be desirable in some cases. The nickel surface can then be ground substantially flat by using optical grinding powders and a lapping machine. However, other processes are also suitable for forming a smooth conducting surface such as shown in Olson U.S. Pat. No. 3,647,642. The purpose of the nickel layer is to provide a smooth surface and a conductive coating for electroforming mesh thereon. The purpose of having a smooth surface is to allow the mesh to easily be stripped from the conducting layer.

In the next step the nickel surface 11 is coated with a uniform layer of light sensitive photoresist. A technique for applying this type of resist is more fully described in the aforementioned Tinklenberg U.S. Pat. No. 2,765,230. After the layer of photoresist has been applied, the excess photoresist is wiped off. When the light sensitive emulsion has become stable, the coated surface is thoroughly dry and ready for photoprinting.

In the next step a master printing plate comprising a ruled grid which contains the image of the design is used as a printing master to produce a mesh pattern on the photoresist. After exposure to a light source the image on the matrix plate is developed by the application of a suitable developer and the desired portions of the photoresist are washed away.

Figure 1:
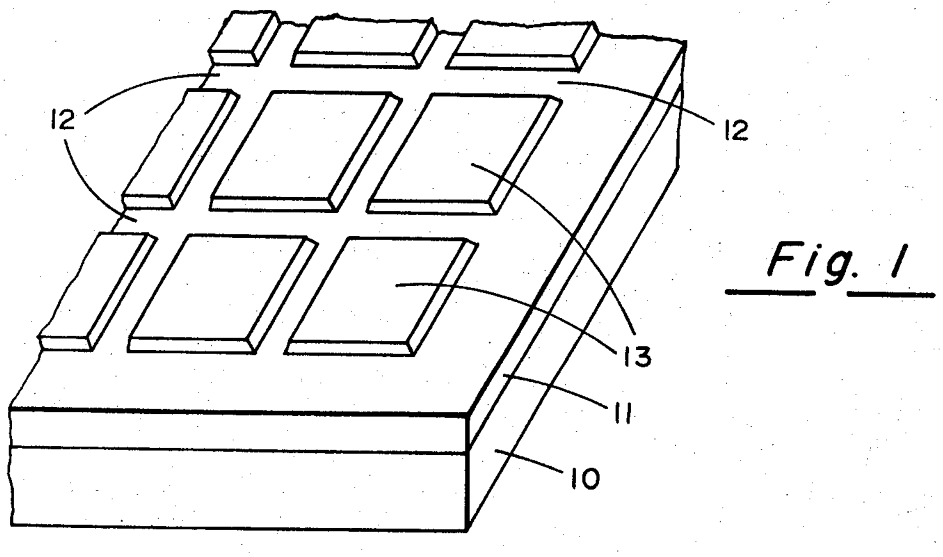
FIG. 1 is a perspective end view showing the master plate with islands of resist located thereon.

Referring to FIG. 1, the matrix now comprises a set of resist islands 13 which are located on the nickel coating 11 which is located on the base plate 10. The recess regions defined by reference numeral 12 are the conducting regions where mesh can be electroformed thereon. The matrix as shown in FIG. 1 is suitable for electroforming mesh as described in the Tinklenberg patent. However, in the present invention one takes the matrix of FIG. 1, which is already suitable for electroforming mesh, and applies a nonconductive layer of silica over the surface of the mesh. The term silica used herein is intended to mean silicon dioxide ($SiO_2$) in its various forms. This renders the matrix unsuitable for electroplating mesh. The silica or glass layer can be applied by sputtering. The sputtering process produces a fine layer of glass on top of the resist as well as the nickel surface. The thickness of this glass or silica layer is on the order of about 20,000 angstroms. The layer of silica must be made sufficiently thick to have good durability yet sufficiently thin to prevent excessive filling of the recess regions 12 between the resist islands 13. As this process is suitable for use in making mesh with up to 2,500 line pairs per inch, the width of recess regions 12 is on the order of less than .0005 of an inch.

Figure 2:
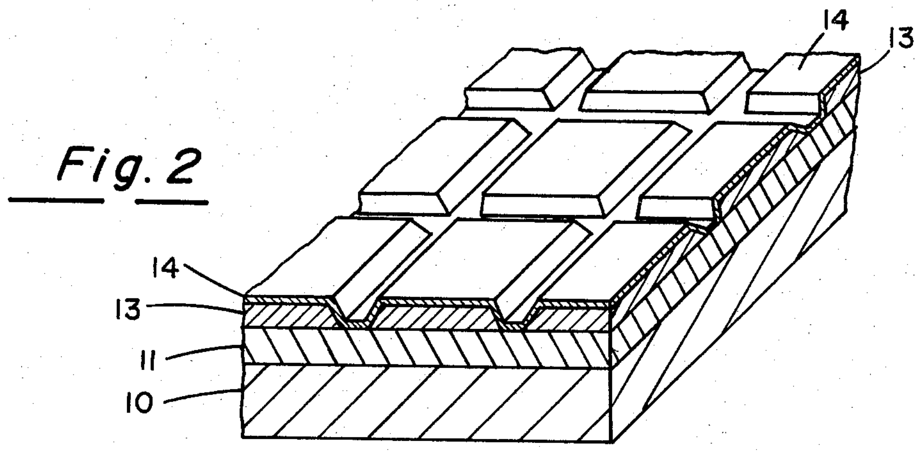
FIG. 2 is a sectioned view showing the master plate of FIG. 1 with a sputtered layer of silica covering the entire resist islands and the conducting surface.

FIG. 2 shows my matrix with a coating of silica 14 covering the resist islands 13 and the recess regions 12. Before applying the silica layer, one could directly electroform mesh onto matrix 10 because of the conductive nickel surface 12. However, with the silica covering on the resist islands 13 and the conductive surface 12, one cannot electroform mesh because the silica is nonconductive. Therefore, the recess regions of the matrix must be filled with a conductive substance before the mesh can be electroformed.

Figure 3:
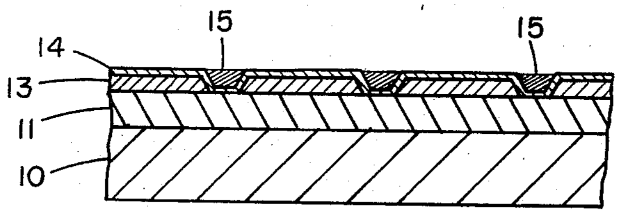
FIG. 3 is an end view of the matrix showing the recesses filled with a conducting material.

In this process a conventional evacuable bell jar is placed over the matrix in order to sputter metal on the matrix. In a typical process an aluminum disk is coated on one surface with a suspension of metals in volatile oils known as Liquid Bright Palladium No. 62. The coated disk is then heated in an oven to 425° C. in order to drive off the volatile suspending agents. When dried the coating on the disk comprises one part bismuth, seven parts palladium and 25 parts gold. The coated disk is then placed inside the jar about 2 inches above the matrix. The cathode and anode are then connected to a source DC current capable of producing 3,000 volts at one ampere. Then the evacuated bell jar is sealed and evacuated to a pressure of 1 millimeter of mercury to create a glow discharge at 2,500 volts for 2 minutes. This produces a sputter metal coating over the glass master or matrix. After sputtering the fine metal coating over the entire silica surface of the matrix, the matrix is placed in a developing tray containing distilled water. Next, the raised areas between the recess region grooves are rubbed gently with a squeegee to remove the sputtered metal on the raised portion of the matrix. After rubbing the top of the matrix the sputtered metal which has been deposited in the recess on the matrix remains in the recess as shown in FIG. 3. The conducting material 15 located on the region or recess 12 between can now be used as a conducting surface for electroforming the mesh thereon.

Figure 4:
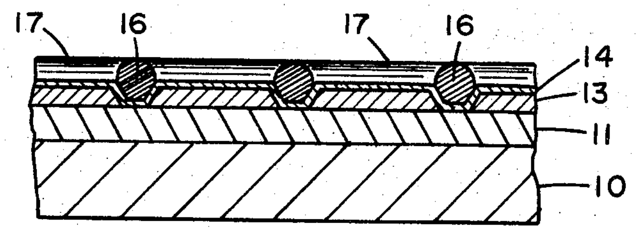
FIG. 4 is an end view of the matrix showing the mesh electroformed in the recessed regions.

In the next step the conductive material 15 is connected to a suitable electroforming apparatus for electroforming material on top of the conducting layer located in the recessed region. FIG. 4 shows the conducting layer 15 with electroformed mesh lines 16 and 17 located on top of conducting material 15. After electroforming the mesh and conducting material which now comprises part of the mesh, the mesh is stripped from the matrix and the process of sputtering metal onto the silica coated surface is repeated.

With the present invention the matrix can be repeatedly reused because it is as durable as a solid glass matrix. On the other hand, the cost of the matrix is only a fraction of the cost of a solid glass matrix.

I claim:

1. The method of producing mesh having up to 2,500 line pairs per inch comprising the steps of forming a matrix on a substrate, applying a smooth substantially flat conductive layer of nickel on said substrate, then applying to said surface a photoresist coating of uniform thickness, then photoprinting and exposing the image of the mesh pattern thereon, removing the exposed portion of said photoresist coating, curing said photoresist coating to produce a permanent bond between said photoresist coating and said conductive layer of nickel on the matrix to thereby cause said photoresist coating to project from said surface in the form of resist islands, then sputtering a layer of silica over said matrix to thereby produce a continuous silica coating on the order of about 20,000 angstroms over said resist islands and said exposed conducting layer, then sputtering a layer of electrically conductive metal over the entire surface of said matrix followed by removing the sputtered electrically conductive metal from the top surface of the resist islands on said matrix, then electroforming on the layer of conductive metal located in the recess of said matrix until a self supporting mesh screen is obtained and then stripping said mesh from said matrix.

2. A matrix for use in the production of fine mesh comprising a base plate having a suitable flat surface; a plurality of islands of photoresist located in a spaced and regular pattern on a surface of said base plate to thereby provide a pattern of interior interconnected openings between said islands of photoresist; a layer of silica covering said islands of resist and said exposed regions between said islands and a layer of conducting material located in the recess and on top of the silica to thereby provide a base for electroforming thereon.

3. The matrix of claim 2 wherein said layer of silica has a thickness on the order of 20,000 angstroms.

4. A method of forming a matrix plate which comprises forming a substrate with a substantially flat surface, applying to said surface a photoresist, photoprinting on said photoresist coating an image of a grid for forming a mesh pattern, removing the unexposed portion of said coating to produce a set of resist islands on the surface of said substrate and then applying a layer of silica over said photoresist coating and said substrate to produce a silica coated matrix suitable for repeated use as a matrix for manufacture of mesh.

5. The process of claim 4 wherein the recess region between said resist islands are covered with a layer of conducting material.

* * * * *